(12) United States Patent
Keren (10) Patent No.: US 10,492,057 B2
(45) Date of Patent: Nov. 26, 2019

(54) DYNAMIC MULTI IMSI WITH NATIVE APN

(71) Applicant: Roamability LTD, Or Yehuda (IL)

(72) Inventor: Eitan Keren, Ganei Tikva (IL)

(73) Assignee: ROAMABILITY LTD, Or Yehuda (IL)

(*) Notice: Subject to any disclaimer, the term of this patent is extended or adjusted under 35 U.S.C. 154(b) by 0 days.

(21) Appl. No.: 16/341,938

(22) PCT Filed: Sep. 13, 2017

(86) PCT No.: PCT/IL2017/051031
§ 371 (c)(1),
(2) Date: Apr. 15, 2019

(87) PCT Pub. No.: WO2019/053702
PCT Pub. Date: Mar. 21, 2019

(65) Prior Publication Data
US 2019/0246263 A1    Aug. 8, 2019

(51) Int. Cl.
*H04W 8/10* (2009.01)
*H04W 8/12* (2009.01)
(Continued)

(52) U.S. Cl.
CPC ............. *H04W 8/10* (2013.01); *H04W 4/24* (2013.01); *H04W 8/12* (2013.01); *H04W 8/26* (2013.01); *H04W 76/10* (2018.02)

(58) Field of Classification Search
CPC ..... H04W 48/18; H04W 88/06; H04W 48/16; H04W 8/18; H04W 76/10; H04W 12/06;
(Continued)

(56) References Cited

U.S. PATENT DOCUMENTS 9,374,840 B2 * 6/2016 Monedero Recuero ..................... H04W 76/10
9,572,096 B2   2/2017 Kim et al.
(Continued)

FOREIGN PATENT DOCUMENTS

WO   2012664980 A1   5/2012
WO   2013085852 A1   6/2013
WO   2013174388 A1   11/2013

*Primary Examiner* — Nimesh Patel
(74) *Attorney, Agent, or Firm* — Soroker Agmon Nordman (57) ABSTRACT

A method for roaming between cellular carriers, the method comprising: obtaining from a Home Public Land Mobile Network (home network) at least one International Mobile Subscriber Identity (IMSI) number; generating an identification code and sending it to the home network with an indication of a location of the identification code in a Packet Data Protocol (PDP) of a context request response; configuring a User Equipment (UE) with instructions to insert the identification code into a specific mandatory characteristic of the PDP, in a response to a context request received from the home network; requesting the home network to mark an UE's identification element, presenting the identification code located in the specific mandatory characteristic of the PDP, to distinguish it from other UEs; and requesting the home network carrier operator to direct incoming roaming data from the UE using a marked UE identification element to a mediating roaming service server.

14 Claims, 5 Drawing Sheets

(51) Int. Cl.
*H04W 8/26* (2009.01)
*H04W 76/10* (2018.01)
*H04W 4/24* (2018.01)

(58) Field of Classification Search
CPC ......... H04W 4/24; H04W 8/08; H04W 88/16; H04W 84/12; H04W 8/183; H04W 28/08; H04W 4/50; H04W 72/0413; H04W 88/08; H04W 36/14; H04W 4/90; H04W 84/042; H04W 12/08; H04W 4/023; H04W 28/0247; H04W 36/0022; H04W 48/17; H04W 36/12; H04W 52/243; H04W 76/16; H04W 28/0215; H04W 4/60; H04W 4/00; H04W 8/12; H04W 8/06; H04W 60/00; H04W 8/26; H04W 8/04; H04W 8/02; H04W 4/029; H04W 4/16; H04W 92/02; H04W 24/04; H04W 36/24; H04W 40/00; H04W 40/20; H04W 8/205; H04W 92/16; H04W 92/24; H04W 8/065; H04W 8/20; H04W 36/0083; H04W 12/00514; H04W 16/32; H04W 36/0085; H04W 48/02; H04W 92/12; H04W 12/00516; H04W 24/02; H04W 8/10; H04W 12/00405; H04W 28/0026; H04W 36/0016; H04W 80/00; H04W 8/186; H04W 48/04; H04W 8/24; H04W 4/024; H04W 72/04; H04W 84/045; H04W 88/18; H04W 68/12; H04W 88/12; H04W 92/04; H04W 72/02; H04W 84/005; H04W 8/22; H04W 8/082; H04W 60/04; H04W 4/80; H04W 12/0023; H04W 60/06; H04L 41/0893; H04L 41/5003; H04L 47/20; H04L 12/1407; H04L 41/5054; H04L 5/0055; H04L 63/0892; H04L 63/102; H04L 63/20; H04L 12/4641; H04L 2209/80; H04L 41/0876; H04L 41/5025; H04L 61/1588; H04L 61/203; H04L 67/306; H04L 47/14; H04L 63/0876; H04L 65/102; H04L 65/103; H04L 65/105; H04L 65/80; H04L 67/18; H04L 65/1016; H04L 41/18; H04L 61/1511; H04L 12/1442; H04L 12/1475; H04L 65/1069; H04L 65/1073; H04L 65/1096; H04L 67/04; H04L 29/12905; H04L 51/38; H04L 61/6054; H04L 41/08; H04L 41/0806; H04L 41/12; H04L 41/5041; H04L 43/16; H04L 43/0811; H04L 1/1812; H04L 1/1822; H04L 63/0272; H04L 63/08; H04L 63/10; H04L 12/66; H04L 67/12; H04L 67/24; H04L 67/16; H04L 67/303; H04L 67/34; H04L 65/1006; H04L 65/1073; H04L 51/38; H04L 51/20; H04L 2012/2841; H04L 2012/5607; H04L 29/06; H04L 29/06027; H04L 29/12066; H04L 29/12122; H04M 15/00; H04M 15/745; H04M 15/8083; H04M 15/28; H04M 15/85; H04M 15/851; H04M 2215/0184; H04M 15/80; H04M 15/88; H04M 15/66; H04M 15/8038; H04M 3/42365; H04M 15/60; H04M 15/63; H04M 15/8228; H04M 15/8033; H04M 2207/18; H04M 15/8214; H04M 7/1285; H04M 15/49; H04M 2215/32; H04M 2215/34; H04M 2215/52; H04M 2215/782; H04M 15/90; H04M 7/123; H04M 7/1235; H04M 7/128; H04M 2207/20; H04M 3/42229; H04M 3/42272; H04M 1/72522; H04M 7/1255; H04M 3/42; H04M 15/70; H04M 15/715; H04M 15/725; H04M 15/7556; H04M 2215/2026; H04M 2215/208; H04M 2207/12; H04M 2207/206; Y10S 707/912; Y10S 707/913; Y10S 707/918; H04Q 2213/13196; H04Q 2213/13282; H04Q 3/0025; H04Q 3/0037; H04Q 2213/13345; H04Q 13/13196; H04Q 2213/13176; H04Q 2213/13098; G06Q 30/0255; G06Q 30/0201; G06Q 50/01; G06Q 30/0254; G06Q 30/0269; G06Q 30/0261; G06Q 30/0267; Y02D 70/00; Y02D 70/1224; Y02D 70/1242; Y02D 70/1262; Y02D 70/142; Y02D 70/144; Y02D 70/146; Y02D 70/162; Y02D 70/164; Y02D 70/20; Y02D 70/26

See application file for complete search history.

(56) References Cited

U.S. PATENT DOCUMENTS

| | | | |
|---|---|---|---|
| 2014/0357219 A1* | 12/2014 | Nicolaescu | H04M 15/8038 455/406 |
| 2015/0183165 A1 | 7/2015 | Abe et al. | |
| 2015/0223042 A1 | 8/2015 | Li | |
| 2016/0183178 A1 | 6/2016 | Marimuthu | |
| 2017/0118622 A1* | 4/2017 | Jiang | H04W 8/12 |

* cited by examiner

DYNAMIC MULTI IMSI WITH NATIVE APN

FIELD OF THE INVENTION

The present disclosure generally relates to the field of cellular network carriers, and more specifically to roaming between different cellular network carriers.

BACKGROUND

During the past decade, the cellular network world has gone through a major change. Since the invention of the smart phone, the need for phone bundles including phone and internet communication packages has increased dramatically. Combined with the increase of daily use of smart devices and traveling the need for roaming capabilities has also increased dramatically.

Mobile phone operating systems has come a long way in the last few years. One of the main developments that took place was in the field of data transmission, from and to the end user. Furthermore, the ability, need and frequency of a mobile device/User Equipment (UE) to transition between a mobile carriers to another has also increased dramatically. In order to facilitate the increasing amount and/or demand for roaming operations, e.g. transitions between cellular carriers, while maintaining data transfer from/to the UE, some vendors have implemented an Automatic Access Point Name (APN) setting. In order for any mobile device to make a data connection, it must be configured with an APN to present to the carrier. In order to do so, some UE vendors have implemented a method that reads the Mobile Country Code (MCC) and/or Mobile Network Code (MNC) from the International Mobile Subscriber Identity (IMSI) of the Subscriber Identification Module (SIM) Card. Then, the APN of the device is adapted based on the identified MCC and/or MNC, in order to allow communications with the corresponding network operator that provided the SIM card.

SUMMARY

According to an aspect of some embodiments of the present invention, there is provided a method for roaming between cellular carriers, the method comprising: obtaining from a Home Public Land Mobile Network (home network) at least one International Mobile Subscriber Identity (IMSI) number; generating an identification code and sending it to the home network with an indication of a location of the identification code in a Packet Data Protocol (PDP) of a context request response; configuring a User Equipment (UE) with instructions to insert the identification code into a specific mandatory characteristic of the PDP, in a response to a context request received from the home network; requesting the home network to mark an UE's identification element, presenting the identification code located in the specific mandatory characteristic of the PDP, to distinguish it from other UEs; and requesting the home network carrier operator to direct incoming roaming data from the UE using a marked UE identification element to a mediating roaming service server.

Optionally, the method further comprising identification element that is a PDP message.

Optionally, the method further comprising identification element that is an IMSI number.

Optionally, the method further comprising mediating roaming service server that uses the home network's resources or infrastructure.

Optionally, the method further comprising mediating roaming service server that is not registered as a local operator in the home network's country, and does not own, maintain or operate network facilities.

Optionally, the method further comprising mediating roaming service server that is registered as a local operator in the home network's country, and own, maintain or operate network facilities.

Optionally, the method further comprising an IMSI number of the UE that is marked by the home network along with or instead of the PDP contest request.

Optionally, the method further comprising mediating roaming service server that acts as the operator for the UE.

Optionally, the method further comprising identification code characteristics that are charging characteristics.

Optionally, the method further comprising mediating roaming service server that generates charging fees for the UE, which are independent from the charging fees created by so the home network.

Optionally, the method further comprising roaming transition between cellular carriers which is done automatically, without the need for human intervention or change of an Access Pint Name (APN).

According to an aspect of some embodiments of the present invention, there is provided a system for roaming between cellular carriers, the system comprising of: at least one processor configured to execute instructions for: obtaining from a Home Public Land Mobile Network (home network) at least one International Mobile Subscriber Identity (IMSI) number; generating an identification code and sending it to the home network with an indication of a location of the identification code in a Packet Data Protocol (PDP) of a context request response; configuring a User Equipment (UE) with instructions to insert the identification code into a specific mandatory characteristic of the PDP, in a response to a context request received from the home network; requesting the home network to mark the UE's PDP, presenting the identification code located in the specific mandatory characteristic of the PDP, to distinguish it from other PDP messages; and requesting the home network carrier operator to direct incoming roaming data from the UE using a marked UE PDP message to a mediating roaming service server.

According to an aspect of some embodiments of the present invention, there is provided a method for roaming between cellular carriers, the method comprising: generating an identification code and sending it to a Home Public Land Mobile Network (home network) with an indication of a location of the identification code in a registration request when authenticating a User Equipment (UE)'s SIM card and/or IMSI number; configuring the UE with instructions to insert the identification code into a specific mandatory characteristic of the registration request, in a response to a context request received from the home network; requesting the home network to mark an UE's IMSI number or SIM card data, in the relevant serving data nodes, presenting the identification code located in the specific mandatory characteristic of the registration request; and requesting the home network to change the data handling and routing by reflecting the user SIM card profile, data and/or identification, stored in the serving data nodes, in the data gateway nodes, based on the identification code.

Optionally, the method further comprising a home network that is configured to direct incoming roaming data from the UE using a marked UE's IMSI number, marked UE's SIM card or marked UE's serving data nodes to a mediating roaming service server.

BRIEF DESCRIPTION OF THE DRAWINGS

Some non-limiting exemplary embodiments or features of the disclosed subject matter are illustrated in the following drawings.

In the drawings.

With specific reference now to the drawings in detail, it is stressed that the particulars shown are by way of example and for purposes of illustrative discussion of some embodiments of the invention. In this regard, the description taken with the drawings makes apparent to those skilled in the art how embodiments of the invention may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present invention describe a method for enabling easy and accessible roaming transition capabilities between network carriers by replacing a User Equipment (UE) International Mobile Subscriber Identity (IMSI). The roaming occurs automatically, without the use of human intervention or the need to change an Access Point Name (APN) settings.

According to some embodiments of the present invention, the roaming transition between carriers may take place while keeping control of the user data usage in real time, for example by using a Multi IMSI solution, as described herein. The roaming may take place for example, between and/or via a Visitor Public Land Mobile Network (VPLMN), i.e. a visitor network and/or a Home Public Land Mobile Network (HPLMN), i.e. a home network, facilitated by a mediating roaming service server. The mediating roaming service server may use the network resources of the visitor network and/or the home network, such as antennas and/or other communicating network. This, may enable the users of the UE to connect to the local carrier via mediating roaming service server. It should be noted that a visitor network may refer to a Public Land Mobile Network (PLMN) which a UE has roamed into when leaving their origin home network.

As mentioned above, in order for any mobile device to make a data connection, a UE may be configured with an APN and present the APN to a network carrier. When using a Multi IMSI applet solution while roaming into a new cellular carrier, the UE's IMSI number may be replaced. The multi IMSI solution may cause the UE Operating System (OS) to change its APN accordingly, for example the applet may change an IMSI number and may then also change the APN according to the new IMSI number selected.

According to some embodiments, when using the Multi IMSI solutions, the IMSI number may be provided by a home network and/or a mediating roaming service server. For example, a home network carrier may provide a sub IMSI number range to the Multi IMSI solution provider e.g. the mediating roaming service server, making it possible for the mediating roaming service server to assign an IMSI number to a UE. When roaming into a new cellular carrier, a UE IMSI may be unknown to the home network and therefore may reject a PDP (Packet Data Protocol) context create message coming from a remote Serving GPRS Support Node (SGSN) and/or Mobility Management Entity (MME). This may result, in the need for manual replacement of the UE OS APN setting, in order for it to match the Multi IMSI vendor APN.

According to some embodiments of the present invention, the use of a "Dynamic Multi IMSI (DMI) Native APN" solution may solve the need for manual intervention when roaming into a new cellular carrier. Furthermore, even upon IMSI replacement of the SIM card, the user of the UE may not need to change its APN setting and may use the native public APN of the home network. For example, using the home network Gateway GPRS Support Node (GGSN) and/or Packet Data Network Gateway (PGW) or its own GGSN/PGW.

According to some embodiments, the mediating roaming service server may alter the data handling and/or routing, by requesting the home network to change serving data nodes corresponding to the UE's SIM card, for example visitor Serving GPRS Support Node (vSGSN) and/or visitor Mobility Management Entity (MME), stored in the UE's SIM card profile. For example, the home network may alter the data handling and/or routing by reflecting, the user SIM card profile, data and/or identification, stored in the serving data nodes, in the data gateway nodes, via the PDP GPRS Tunneling Protocol—control (GTP-c), for example GGSN and/or PGW. For example, this may be done in the registration process of the UE to the home network and/or based on field values received during the registration process. By changing the registration signaling, the home network may apply special routing rules, for example based upon field values, which are transferred during the registration process to the home network. For example, by inserting an identification code to a specific mandatory characteristic. It should be noted that the home network may alter the UE's serving data nodes by using for example, the information located in the UE's SIM card, and may also be able to store the SIM card's profile, for example in Home Location Register (HLR) when using 2G and/or 3G communication protocol and/or Home Subscriber Server (HSS) when using 4G communication protocol.

This may be possible, for example, by inserting an identification code to a registration request and/or an initial authentication step of a UE's SIM card and/or IMSI number, for example a specific mandatory characteristic. For example, by creating a PDP context request that may contain the identification code. It should be noted that mandatory characteristic are characteristic that must be present in any PDP. The mandatory characteristic may be, charging characteristics values inserted, for example, into the PDP context request. The PDP context request created may be send from a visitor network Serving GPRS Support Node (SGSN) and/or mobility management entity (MME), for example, to the used IMSI home network packet handling node using 2G and/or 3G communication so protocol, called GGSN, and/or for 4G communication protocol, called PGW. It should be noted that the method for altering the data handling and/or routing may be applied, in its basic form, to all forms of network communication protocols, as described in the example above for 2G, 3G and/or 4G communication protocols.

Once the PDP context request, containing the identification code characteristics reaches the home network it is authenticated and/or compared to the carrier's guidelines, e.g. the home network will look for the identification code in the pre-agreed location. For example, the pre-agreed values may be inserted inside the IMSI home network GGSN and/or PGW in the PDP context request. If the received PDP context request contains the identification code, it may be marked e.g. the request will stand out from other PDP context request so it may be identified easily and efficiently by the home network local carrier. The marked request may no longer be authenticate under the home network even while using the home network IMSI range, and may be directed to a mediating roaming service server.

Is should be noted that a home network may choose to mark the UE's SIM profile in different ways than to mark the PDP context request. For example, the home network may choose to mark an IMSI number used by the UE and/or to mark its serving data nodes.

As soon as the UE's PDP is marked the home network may divert data, coming and/or going to the UE, to the mediating roaming service server, "appointing" the mediating roaming service server as the UEs mobile operator de facto. The UE will be set and registered at the home network using a preselected IMSI number assigned by the mediating roaming service server, from a preselected IMSI range obtained from the home network. The mediating roaming service server may control and monitor the UE's data service and usage in real time. For example, the mediating roaming service server may monitor the amount of data the UE used up to a selected time, and calculate how much the user, of the UE, may need to pay. The mediating roaming service server may also be responsible for communication with the user of the UE, for example, sending them information regarding the amount of data used and/or billing information. This procedure may simplify the registration process and operation for most UE users wishing to roam outside their origin home network.

According to some embodiments of the present invention, this method may allow native and/or foreign APN to be supported automatically, without human involvement of the APN setting on the UE by a home network and/or mediating roaming service server. This may be allowed as long as the Multi IMSI local carrier changes the specific mandatory so characteristics so that the PDP context request of the mediating roaming service server is distinguished form other PDP context request, and/or while using the same IMSI range.

According to some embodiments of the present invention, the "Dynamic Multi IMSI (DMI) Native APN" method may, add the home network APN's to the SGSN and/or Serving Gateway (SGW) visitor network Nodes via SS7 MAP Insert Subscriber Data (ISD) and Diameter s6a Update Location Answer (ULA) to match the UE APN setting for example, in a thread generation (3G) network.

Some embodiments of the present invention may include a system, a method, an apparatus and/or a computer program product. The computer program product may include a tangible non-transitory computer readable storage medium (or media) having computer readable program instructions thereon for causing a processor to carry out aspects of the present invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
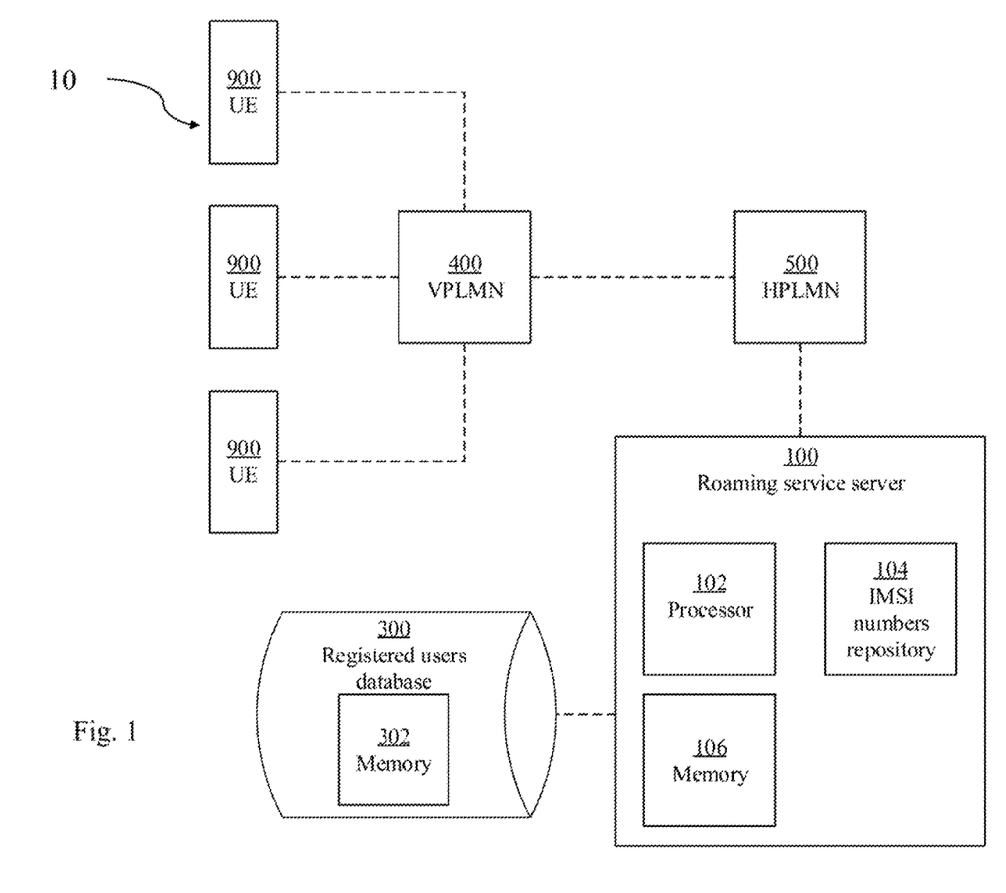
FIG. 1 is a schematic illustration, illustrating a system for roaming between cellular carriers, according to some embodiments of the present invention.

Reference is now made to FIG. 1, which is a schematic illustration of system 10 for roaming between cellular carriers, according to some embodiments of the present invention. In some embodiments roaming service server 100 include at least one hardware processor 102, an IMSI numbers repository 104 and a memory 106. In some embodiments registered users database 300 include at least one memory 302. System 10 may also include visitor network 400, home network 500 and/or UE 900. UE 900 may represent a variety of deferent User Equipment's, for example mobile phone, tablets, laptops and/or any other electronic devices using a cellular network connection of that sort. FIG. 1 also illustrates that various UE's may be connected to system 10 simultaneously. Server 100, Database 300, visitor network 400 home network 500 and/or UE 900 may communicate with each other via the cellular network. Although connections are not shown between the components illustrated so in FIG. 1, the components can interact and/or communicate with each other to carry out methods described herein. It should be understood that FIG. 1 and the following description are intended to provide a general understanding of a suitable environment in which various aspects of embodiments may be implemented.

In some embodiments, UE 900 may ask to join local carrier operated by home network 500 via visitor network 400 and/or Server 100, while pre-registered to a service provided and/or operated by Server 100. For example, Server 100 may use an Online Charging System (OCS) to obtain payment directly from a user of UE 900, for example instead of home network 500. Server 100 may display to a user of UE 900 how much data was used up to a specific time and/or charge the user accordingly, for example by the OCS. Upon registration request, home network 500 may send UE 900 a context request, for example, via Server 100 and/or visitor network 400. UE 900 may generate upon such request a PDP response containing an identification code located in a pre-agreed specific mandatory characteristic, for example in the charging characteristic. Processor 102 may then request home network 500 operator to divert UE 900 registration from home network 500 operator to Server 100. Server 100 may then assign UE 900 an available IMSI number stored in repository 104 and store its data in Database 300, memory 302 and/or memory 106.

Once UE 900 is assigned with an IMSI number from repository 104, it may use the cellular network operated by home network 500 and visitor network 400, while registered to Server 100 operating as a mediating roaming service server.

Figure 2:
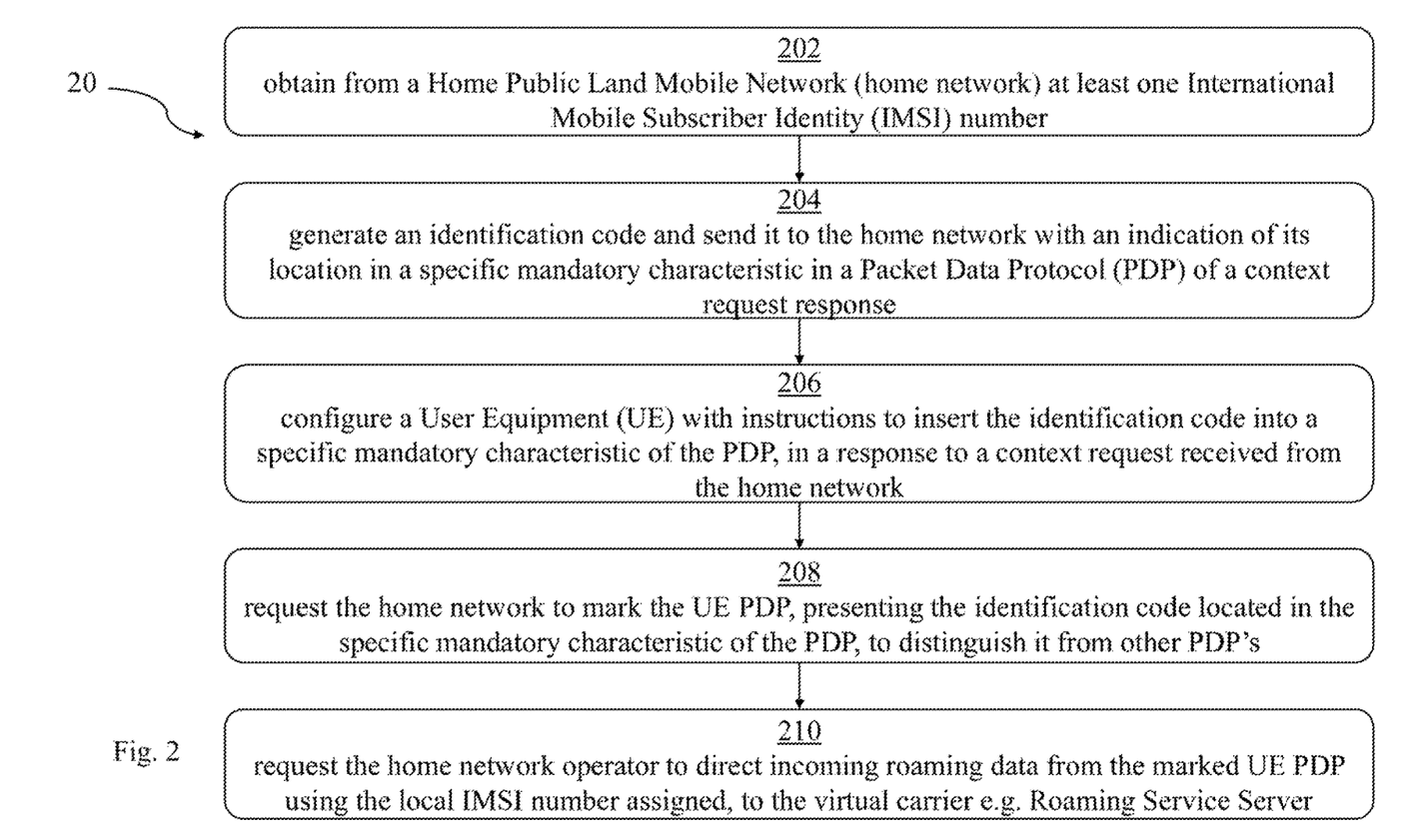
FIG. 2 is a schematic illustration flowchart illustrating a method for roaming between cellular carriers, according to some embodiments of the present invention.

Turning now to FIG. 2, which is a schematic illustration of method 20 for roaming between cellular carriers, according to some embodiments of the present invention. As indicated in block 202, server 100 may obtain from home network 500 at least one IMSI number, and store the numbers obtained in repository 104. The IMSI numbers obtained may then be used for distribution and/or for assigning "local" IMSI numbers to different UEs 900 upon their request to join home network 500. For example the more IMSI numbers stored in repository 104, the more different UE 900 devices may join cellular carrier home network 500 using Server 100 as their mediating roaming service server at the same time.

As indicated in block 204, processor 102 may generate an identification code and send it to home network 500, including an indication of its location in a specific mandatory characteristic, which is inserted into a PDP of a context request response. Once home network 500 receives this data, it may be able to route the incoming UE 900 data, presenting the same value located at the same place when requesting to join the network, so they may so be operated by a mediating roaming service server for example, Server 100.

As indicated in block 206, processor 102 may configure UE 900 with instructions to insert the identification code into a specific mandatory characteristic of a PDP, in a response to a context request, received from home network 500. Processor 102 may configure UE 900 with instructions to insert deferent identification codes according the designated home network 500 that UE 900 may request to join. This may allow UE 900 to roam into a different home network 500 automatically and without changing Server 100 as their mediating roaming service server when moving from one country to another.

As indicated in block 208, once UE 900 presents the identification code located in a specific mandatory characteristic of the PDP, which matches the identification code home network 500 was "looking for" in a designated location, the PDP is marked to distinguish it. For example the marked UE's 900 PDP request may not be authenticate under home network 500 network, even if it's using the networks own IMSI range.

As indicated in block 210, processor 102 may request home network 500 to then direct incoming roaming data origin from a marked PDP UE 900, using a local IMSI number, to Server 100. Server 100 may then act as the mediating roaming service server for the UE 900 with the marked PDP. For example processor 102 may generate data for the user of UE 900 that may include the amount of data used up to a specific time and/or charging fees.

Figure 3:
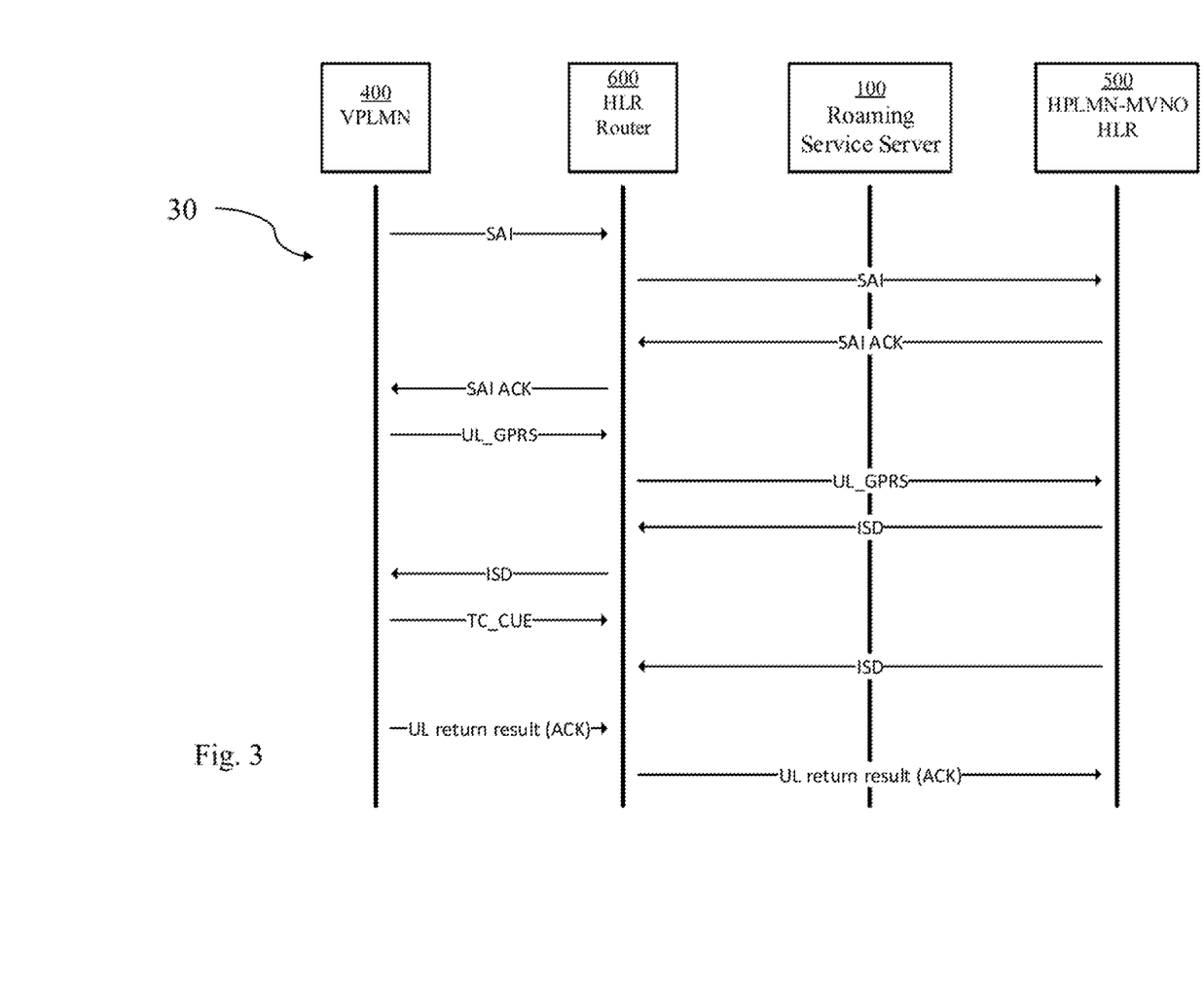
FIG. 3 is a schematic illustration, illustrating a method for Update Location (UL) General Packet Radio Service (GPRS) protocol, according to some embodiments of the present invention.

Turning now to FIG. 3, which is a schematic illustration of Update Location (UL) General Packet Radio Service (GPRS) protocol using mediating roaming service server such as Server 100, according to some embodiments of the present invention. As indicated in FIG. 3, once UE 900 roamed into and/or wants to connect to a new cellular carrier, which is not its original home network, it may Send Authentication Information (SAI) request via visitor network 400. Visitor network 400 may then assign an IMSI number from Server 100 repository 104 to UE 900 and may send a request to home network 500 via Home Location Register (HLR) router 600), home network 500 may then send an acknowledgment message. After receiving the send an acknowledgment message, UE 900 may send home network 500 via visitor network 400 and/or HLR router 600, an UL_GPRS, wherein a PDP context message may contain, for example an identification code in a pre-agreed location. The identification code may be used for marking the PDP context message as indicated previously.

Home network 500, via visitor network 400 and/or HLR router 600, may send back to serving data nodes corresponding to the UE's 900 an ISD, for example based on the PDP context message, UE's 900 IMSI number and/or SIM card data. The ISD may contain data regarding the APN and IMSI number. A Time Code Cue (TC_CUE) reply may be sent by visitor network 400 to HLR router 600 to mark and/or store the registration of UE's 900 IMSI number and/or SIM card data in the relevant data serving node. According to the exemplary embodiment described in FIG. 3 the data serving node may be HLR router 600, representing 2G and/or 3G communication protocol. UE 900 may send home network 500 via visitor network 400 and/or HLR router 600, an UL acknowledgment message, for example to mark its current location.

Figure 4:
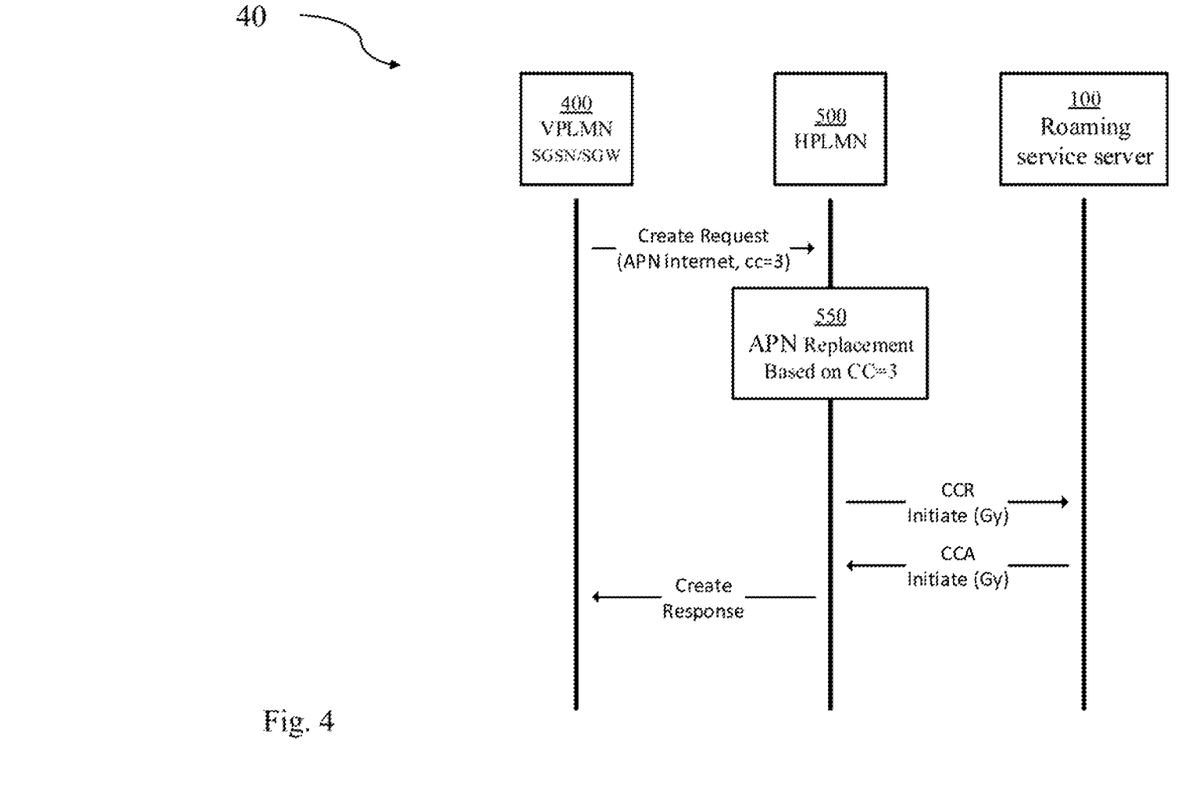
FIG. 4 is a schematic illustration, illustrating a method for an APN replacement protocol, according to some embodiments of the present invention.

Turning now to FIG. 4, which is a schematic illustration of a method for marking a PDP inside a GTP via an APN replacement protocol using mediating roaming service server such as Server 100, according to some embodiments of the present invention. A user subscribing to a mediating roaming service server, for example Server 100, my enable their UE 900 an automatic APN replacement, when roaming into a new home network 500. As can be seen in FIG. 4 once UE 900 roamed into and/or wants to connect to a new cellular carrier, which is not its original home network, it may create a request via visitor network 400, as described in FIG. 3. As indicated in FIG. 4 UE 900 may generate an identification code, for example cc=3, located inside a PDP message and may send it to the home network 500. According to block 550 an APN replacement and/or routing of a native sponsor APN may be based on the identification code received. After replacing the APN to match home network's 500) APN, home network 500 may generate and send to mediating roaming service server, such as Server 100, protocol to administrate UE 900 operation service. For example, as indicated in FIG. 4 home network 500 generates and sends Server 100 a Gy protocol to "hand over" the real time charging data of UE 900. According to the exemplary embodiment described in FIG. 4, Server 100 may act as an OCS node, receiving the Diameter Gy protocol. As indicated in FIG. 4, Server 100 may send back to home network 500 an acknowledgment message. Home network 500 receiving the acknowledgment message may then create a response message and communicate it to UE 900 via visitor network 400.

It should be noted that Server 100 may monitor and/or gather data of the communication between UE 900, home network 500 and/or visitor network 400.

Figure 5:
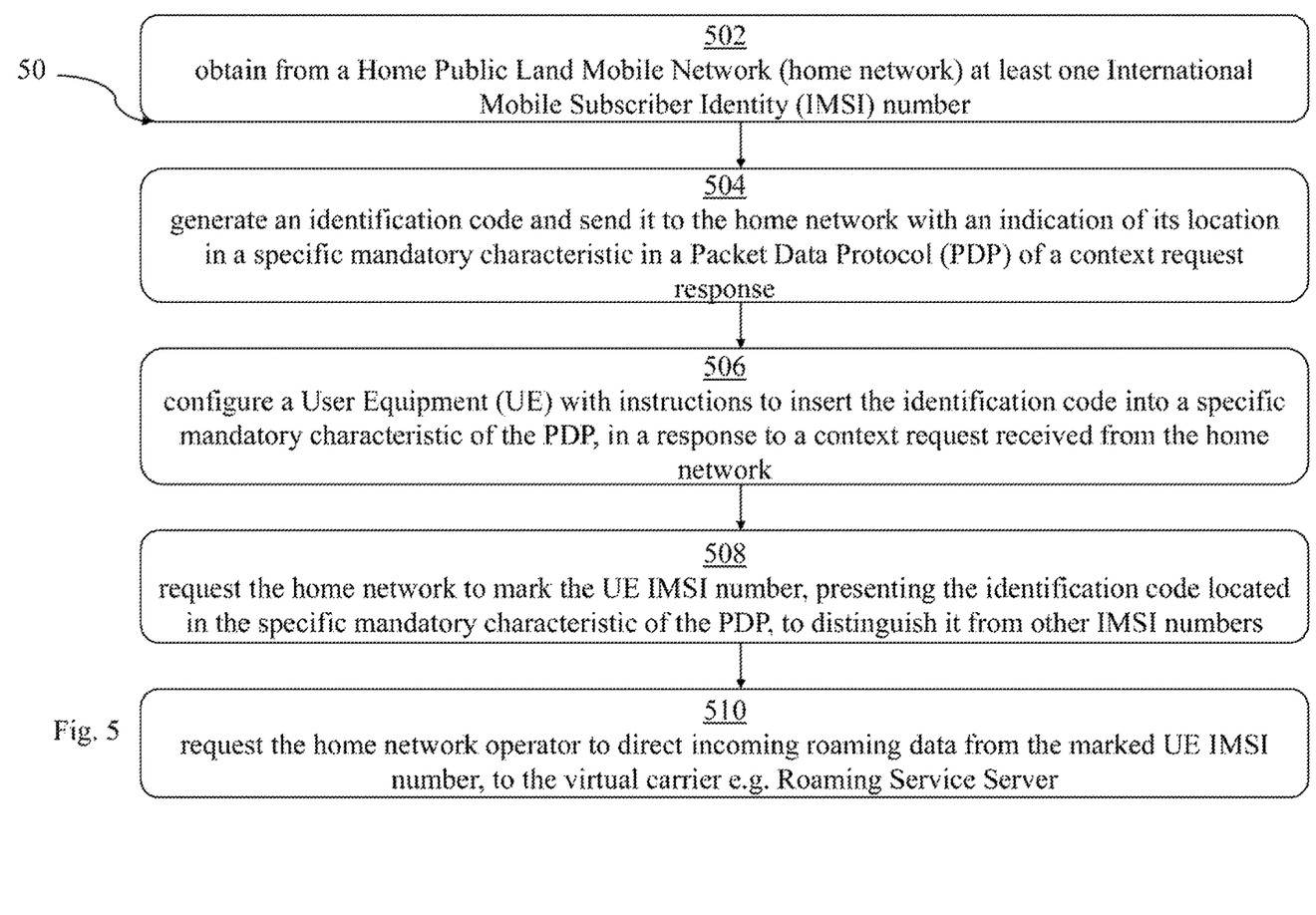
FIG. 5 is a schematic illustration flowchart illustrating a method for roaming between cellular carriers, according to some embodiments of the present invention.

Turning now to FIG. 5, which is a schematic illustration of method 50 for roaming between cellular carriers, according to some embodiments of the present invention. As indicated in block 502, server 100 may obtain from home network 500 at least one IMSI number, and store the numbers obtained in repository 104. The IMSI numbers obtained may then be used for distribution and/or for assigning "local" IMSI numbers to different UEs 900 upon their request to join home network 500. For example the more IMSI numbers stored in repository 104, the more different UE 900 devices may join cellular carrier home network 500 using Server 100 as their mediating roaming service server at the same time.

As indicated in block 504, processor 102 may generate an identification code and send it to home network 500, including an indication of its location in a specific mandatory characteristic, which is inserted into a PDP of a context request response. Once home network 500 receives this data, it may be able to route the incoming UE 900 data, presenting the same value located at the same place when requesting to join the network, so they may be operated by a mediating roaming service server for example, Server 100.

As indicated in block 506, processor 102 may configure UE 900 with instructions to insert the identification code into a specific mandatory characteristic of a PDP, in a response to a context request, received from home network 500. Processor 102 may configure UE 900 with instructions to insert deferent identification codes according the designated home network 500 that UE 900 may request to join. This may allow UE 900 to roam into a different home network 500 automatically and without changing Server 100 as their mediating roaming service server when moving from one country to another.

As indicated in block 508, once UE 900 presents the identification code located in a specific mandatory characteristic of the PDP, which matches the identification code home network 500 was "looking for" in a designated location, the IMSI number is marked to distinguish it. For example the marked UE's 900 IMSI number may not be authenticate under home network 500 network, even if it's using the networks own IMSI range.

As indicated in block 510, processor 102 may request home network 500 to then direct incoming roaming data origin from a marked UEs 900 IMSI number, to Server 100. Server 100 may then act as the mediating roaming service server for the UE 900 with the marked IMSI number. For example processor 102 may generate data for the user of UE 900 that may include the amount of data used up to a specific time and/or charging fees.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary so context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for roaming between cellular carriers, the method comprising:
    obtaining from a Home Public Land Mobile Network (home network) at least one International Mobile Subscriber Identity (IMSI) number;
    generating an identification code and sending it to the home network with an indication of a location of the identification code in a Packet Data Protocol (PDP) of a context request response;

configuring a User Equipment (UE) with instructions to insert the identification code into a specific mandatory characteristic of the PDP, in a response to a context request received from the home network;

requesting the home network to mark an UE's identification element, presenting the identification code located in the specific mandatory characteristic of the PDP, to distinguish it from other UEs; and requesting the home network carrier operator to direct incoming roaming data from the UE using a marked UE identification element to a mediating roaming service server.

2. The method of claim 1, wherein the identification element is a PDP message.

3. The method of claim 2, wherein the mediating roaming service server is not registered as a local operator in the home network's country, and does not own, maintain or operate network facilities.

4. The method of claim 1, wherein the identification element is an IMSI number.

5. The method of claim 1, wherein the mediating roaming service server uses the home network's resources or infrastructure.

6. The method of claim 5, wherein the mediating roaming service server is registered as a local operator in the home network's country, and own, maintain or operate network facilities.

7. The method of claim 1, wherein the IMSI number of the UE is marked by the home network along with or instead of the PDP contest request.

8. The method of claim 1, wherein the mediating roaming service server acts as the operator for the UE.

9. The method of claim 1, wherein the identification code characteristics are charging characteristics.

10. The method of claim 1, wherein the mediating roaming service server generates charging fees for the UE, which are independent from the charging fees created by the home network.

11. The method of claim 1, wherein the roaming transition between cellular carriers is done automatically, without the need for human intervention or change of an Access Pint Name (APN).

12. A system for roaming between cellular carriers, the system comprising of:

at least one processor configured to execute instructions for:

obtaining from a Home Public Land Mobile Network (home network) at least one International Mobile Subscriber Identity (IMSI) number;

generating an identification code and sending it to the home network with an indication of a location of the identification code in a Packet Data Protocol (PDP) of a context request response;

configuring a User Equipment (UE) with instructions to insert the identification code into a specific mandatory characteristic of the PDP, in a response to a context request received from the home network;

requesting the home network to mark the UE's PDP, presenting the identification code located in the specific mandatory characteristic of the PDP, to distinguish it from other PDP messages; and requesting the home network carrier operator to direct incoming roaming data from the UE using a marked UE PDP message to a mediating roaming service server.

13. A method for roaming between cellular carriers, the method comprising:

generating an identification code and sending it to a Home Public Land Mobile Network (home network) with an indication of a location of the identification code in a registration request when authenticating a User Equipment (UE)'s SIM card and/or IMSI number;

configuring the UE with instructions to insert the identification code into a specific mandatory characteristic of the registration request, in a response to a context request received from the home network;

requesting the home network to mark an UE's IMSI number or SIM card data, in the relevant serving data nodes, presenting the identification code located in the specific mandatory characteristic of the registration request; and requesting the home network to change the data handling and routing by reflecting the user SIM card profile, data and/or identification, stored in the serving data nodes, in the data gateway nodes, based on the identification code.

14. The method of claim 13, wherein the home network is configured to direct incoming roaming data from the UE using a marked UE's IMSI number, marked UE's SIM card or marked UE's serving data nodes to a mediating roaming service server.

* * * * *